United States Patent [19]
Kersting

[11] Patent Number: 5,743,795
[45] Date of Patent: Apr. 28, 1998

[54] SELF-PROPELLING HARVESTER THRESHER WITH ADJUSTABLE THRESHING BASKET

[75] Inventor: Hermann Kersting, Oelde, Germany

[73] Assignee: CLAAS KGaA, Harsewinkel, Germany

[21] Appl. No.: 656,760

[22] Filed: Jun. 3, 1996

[30] Foreign Application Priority Data

Jun. 3, 1995 [DE] Germany ............... 195 20 463.8

[51] Int. Cl.⁶ .................................................. A01F 12/28
[52] U.S. Cl. ...................... 460/62; 460/76; 460/109
[58] Field of Search ................ 460/76, 62, 108, 460/109, 141

[56] References Cited

U.S. PATENT DOCUMENTS 4,425,925  1/1984  Kersting et al. ............... 460/62 X
5,395,287  3/1995  Coers ............................. 460/109 X

FOREIGN PATENT DOCUMENTS

4023720A1  1/1982  Germany.
4218610    12/1993 Germany ....................... 460/109
1215639    3/1986  U.S.S.R. ........................ 460/109

Primary Examiner—Terry Lee Melius
Attorney, Agent, or Firm—Michael J. Striker

[57] ABSTRACT

A harvester thresher has two threshing mechanisms which are located directly one behind the other and each have a threshing drum and a threshing basking. The threshing baskets are jointly adjustable so that the basket of the first threshing mechanism is adjustable parallel to itself and by its adjustment the basket of the second threshing mechanism is turnable about an axle provided at the end of the second basket which is spaced from the basket of the first threshing mechanism.

9 Claims, 3 Drawing Sheets

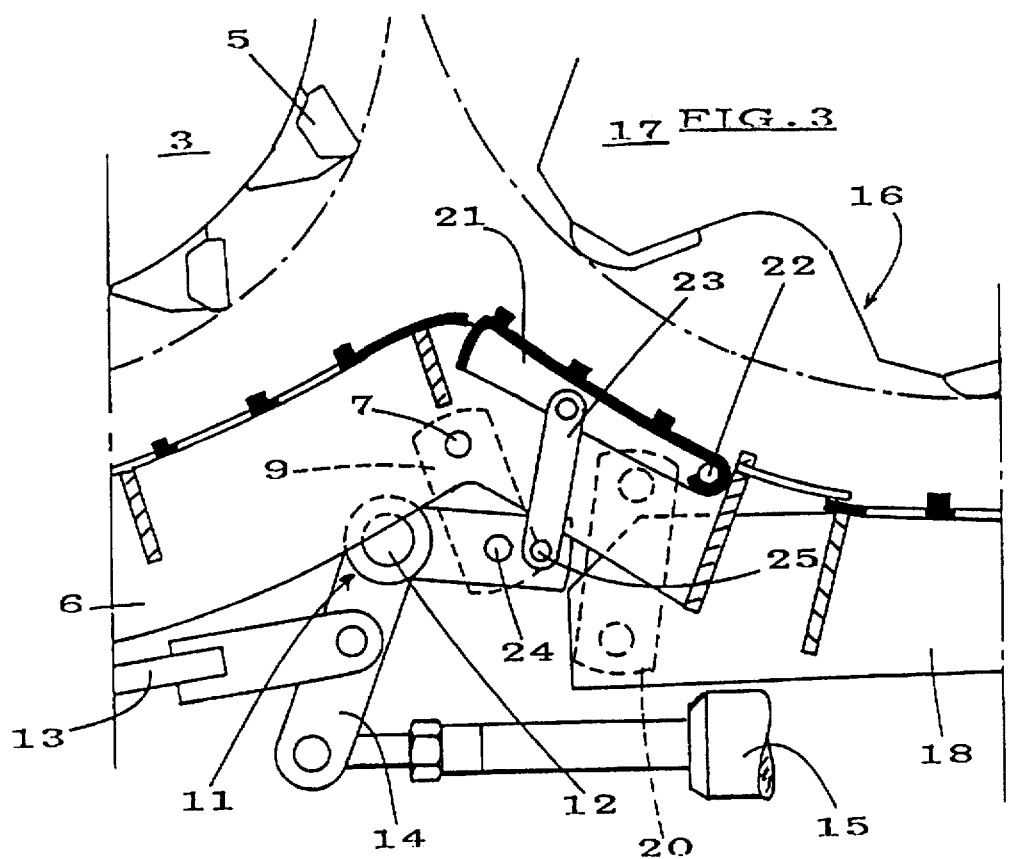
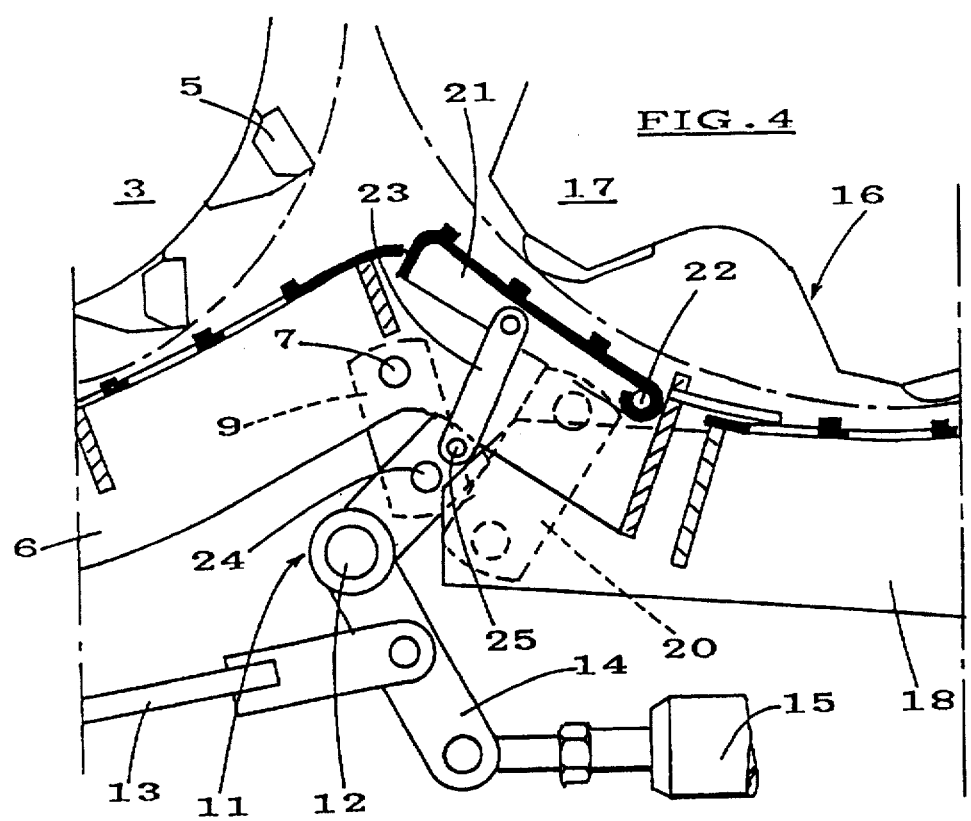

SELF-PROPELLING HARVESTER THRESHER WITH ADJUSTABLE THRESHING BASKET

BACKGROUND OF THE INVENTION

The present invention relates to a self-propelling harvester thresher.

More particularly, it relates to a self-propelling harvester thresher which has at least two threshing mechanisms which are located directly one behind the other, operate in accordance with the principle of a tangential flow, and each have a drum and a basket. In these harvester threshers both baskets are articulatingly connected with one another with their facing ends, both drums are driveable in the same direction, and a gap between the basket and the drum of the first threshing mechanism and a gap between the basket and the drum of the second threshing mechanism are jointly adjustable. The circumferential speed of the first drum as considered in the working direction is smaller than that of the subsequent drum, and the first drum is formed as a fully-cylindrical base body provided with a plurality of drivers which are distributed over its outer surface.

Such a harvester thresher is disclosed, for example in the German Patent Document DE-OS 40 23 720. In this known harvester thresher the ends of the threshing basket which are spaced from one another are supported respectively in a bearing device, while the facing ends are held by a common axle. This common axle is supported at both ends in ears of pulling rods, so that during the actuation of the pulling rods both baskets can be adjusted jointly. It has been recognized as disadvantageous that during the adjustment of the threshing basket the lifting of the axle which connects both threshing baskets, the inlet gap of the first threshing mechanism is increased and the inlet gap of the second threshing mechanism is reduced. In order to obtain a similar change of both inlet gaps, in the known harvester thresher the spaced ends of both threshing baskets are placeable at such a height that the inlet gap of both threshing mechanism can be adjusted afterwards. Such an adjustment, however, involves additional labor and expenses.

SUMMARY OF THE INVENTION

Accordingly, it is an object of the present invention to provide a self-propelling harvester thresher of the above mentioned general type, which avoids the disadvantages of the prior art.

In keeping with these objects and with others which will become apparent herein-after, one feature of the present invention resides, briefly stated, in self-propelling harvester thresher in which the basket of the first threshing mechanism is adjustable substantially parallel to itself, while the basket of the second threshing mechanism is rotatably supported on its end which faces away from the basket of the first threshing mechanism.

When the harvester thresher is designed in accordance with the present invention, then during a joint adjustment of both threshing baskets, the inlet gap of both threshing mechanism is changed in the same sense.

In accordance with another advantageous feature of the present invention, the basket of the first threshing mechanism has pins arranged on both side ends at a distance from one another and transversely to the traveling direction of the harvester thresher. The pins are adjustably supported in the parallel slots of a housing of the harvester thresher.

In order to simplify the adjustment of the basket of the first threshing mechanism, the first threshing mechanism is provided with end bars in the region of its side ends to articulately connect the basket with angle levers which are turnable jointly about a stationary axis similar to a parallelogram.

In accordance with a further feature of the present invention, the turning of the angle levers is performed by a single cylinder-piston unit which engages the leg of the angle lever. The angle levers are connected with one another by a link on their legs which face away from the bars.

In accordance with still a further embodiment of the present invention, the facing ends of both baskets are articulatingly connected with one another by bars.

In accordance with a further important feature of the present invention, the basket of the first threshing mechanism is angled in its end region which faces the second threshing mechanism, and is there associated with or adjusted to the contour circle of the second threshing drum. Alternatively to this embodiment, the basket of the first threshing mechanism in the angled region which adjoins the basket of the second threshing mechanism can be provided with a basket coating formed as a friction or threshing element which is turnably supported at the end in the frame of the basket.

The basket coating which is arranged in an flap-like manner is supported downwardly through bars on the angle levers of the first threshing basket, so that during a displacement of the first basket, the basket coating is adjusted as well. The articulate connection of the bars on the angle levers is selected so that during a displacement of the first basket, the flap is adjusted in advance so that the inlet gap of the second threshing mechanism coincides with the inlet gap of the first threshing mechanism.

In both embodiments of the harvester thresher described herein above, the changes of the inlet gap of both threshing mechanisms are synchronized with one another.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a view showing an embodiment which is different from the embodiment of FIGS. 1 and 2 and in a position with lowered basket of the inventive harvester thresher; and FIG. 4 is a view showing the embodiment of FIG. 3 in a position in which the threshing baskets are adjusted.

DESCRIPTION OF PREFERRED EMBODIMENTS

Figure 1:
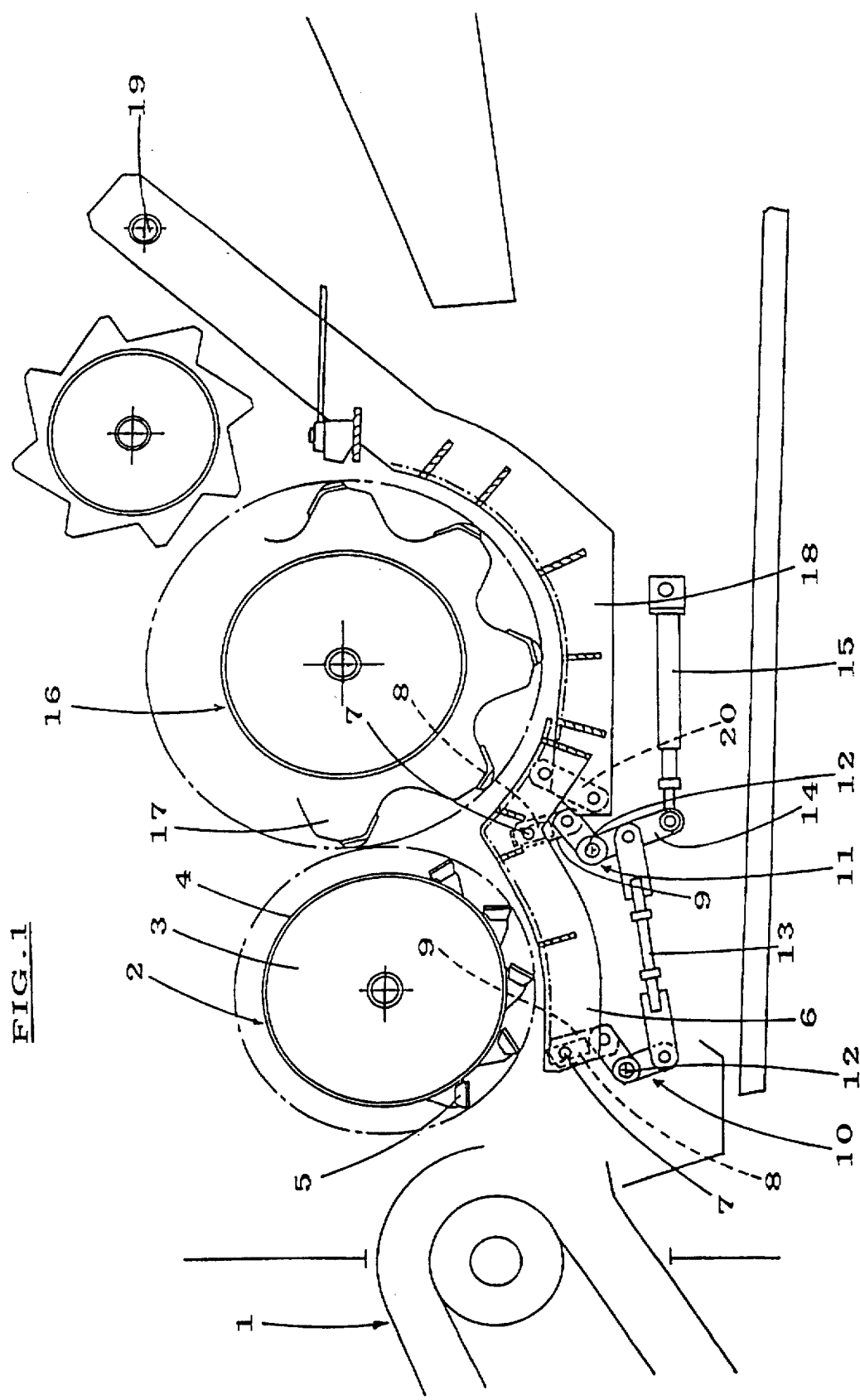
FIG. 1 is a side view of a harvester thresher, and more particularly of its part which provides threshing, in accordance with the present invention.
Figure 2:
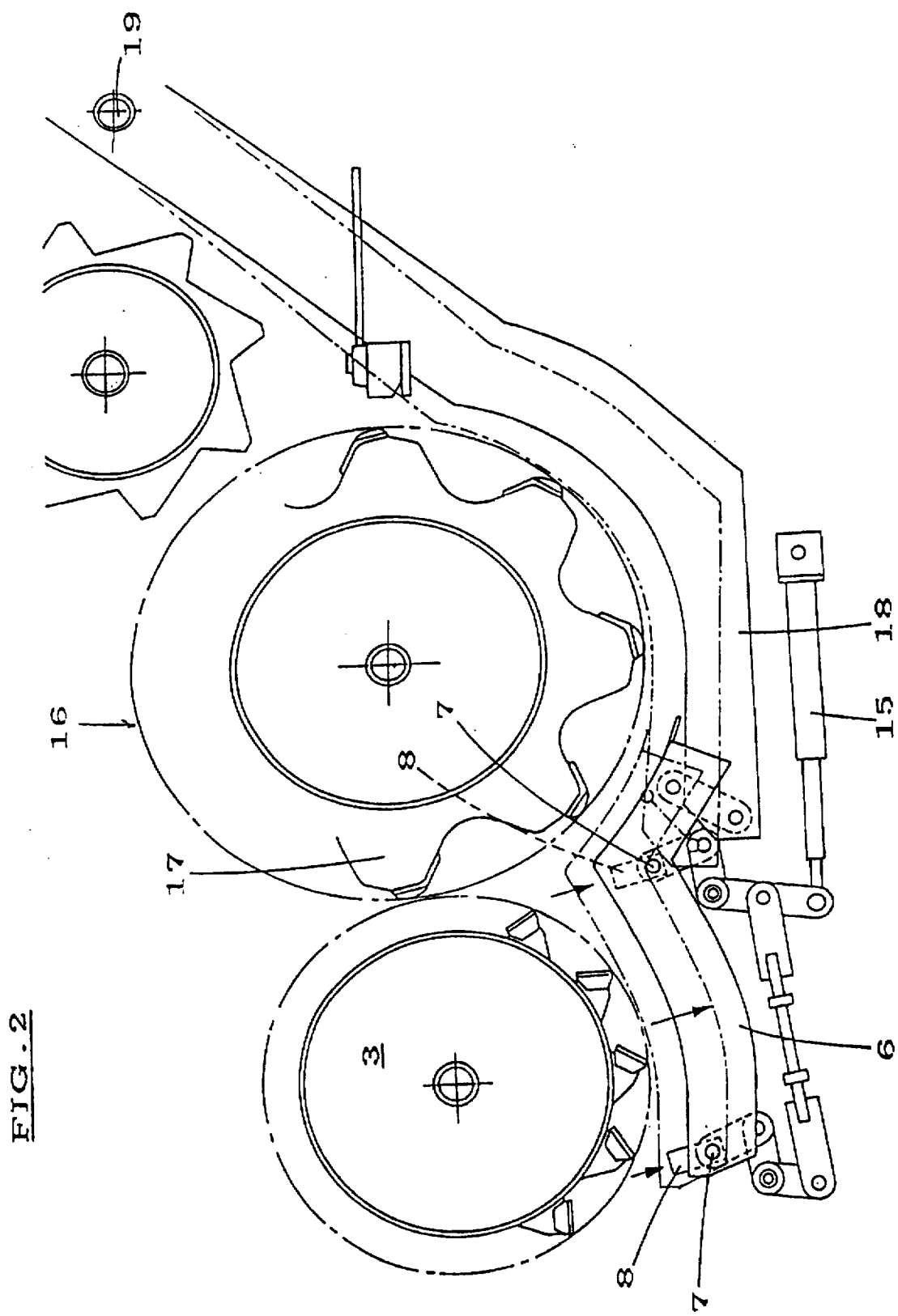
FIG. 2 is a view showing a part of the region illustrated in FIG. 1 in accordance with the present invention, on an enlarged scale.

FIG. 1 shows an inclined conveyer 1 and a first threshing mechanism 2 arranged after the inclined conveyer of a self-propelling harvester thresher in accordance with the present invention. The threshing mechanism 2 includes a threshing drum 3 with a closed cylindrical wall 4 and a plurality of drivers 5 distributed over the circumference of the cylindrical wall. A basket 6 is associated with the threshing drum 3 of the first threshing mechanism 2. The basket 6 is provided with pins 7. The pins are guided in slots 8 which extend parallel to one another and formed in a not shown housing of the harvester thresher. Shackles 9 are arranged on the pins 7 and articulatingly connected with angled levers 10 and 11. The angled levers 10 and 11 are turnable about a fixed axle 12. The legs of the angled levers 10 and 11 which face away from the shackles 9 are connected with one another by a link 13. A leg of the angled lever 11 has an extension 14. A cylinder-piston unit 15 has a piston rod which engages with the extension 14. When the cylinder-piston unit 15 is actuated, the basket 6 is displaced parallel to itself, as can be seen in FIG. 2 and identified with an arrow.

A further threshing mechanism 16 is located after the first threshing mechanism 2. The threshing mechanism 16 also has a threshing drum 17 and an associated basket 18. As can be seen from FIGS. 1 and 2, the basket 6 of the first threshing mechanism 2 has an end which faces the second threshing mechanism 6 and is angled in the region of this end. The angled region corresponds to the contour circle of the threshing drum 17 of the first threshing mechanism 16. The basket 18 of the second threshing mechanism 16 is turnable about an axle 19 which is spaced from the threshing basket 6 of the first threshing mechanism 2. It is articulatingly connected with the angled end of the basket 6 by a shackle 20. Thereby when the inlet gap of the first threshing mechanism 2 is increased, simultaneously the inlet gap of the second threshing mechanism is increased as well. This is shown in particular in FIG. 2 in which the lower position of both baskets is identified with solid lines and adjusted position of both baskets 6 and 18 is shown in broken lines.

FIGS. 3 and 4 show an alternative embodiment in the region of the angled basket of the first threshing mechanism. In this embodiment the region of the angled part of the basket 6 which is operative as a separating agent, is formed as a flap 21. This flap 21 is supported rotatably about an axle 22 and connected articulatingly with a leg of the angle lever 11 through a shackle 23. As can be seen further from FIGS. 3 and 4, an articulating or pivoting point 24 of the shackle 9 is located closer to the turning axle 12 of the angled lever 11 than the articulating point 25 of the shackle 23. Therefore, during actuation of the cylinder-piston unit 15, the flap 21 is placed against the remaining frame part of the basket 6. This can be clearly seen from FIG. 4 in which the flap 21 is located in a position which is lifted from the position shown in FIG. 3.

It will be understood that each of the elements described above, or two or more together, may also find a useful application in other types of constructions differing from the types described above.

While the invention has been illustrated and described as embodied in self-propelling harvester thresher with adjustable threshing basket, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelling harvester thresher, comprising threshing means including at least two threshing mechanisms located one after another in a traveling direction and operating in accordance with the principle of a tangential flow, each of said threshing mechanisms having a drum and a basket defining a gap therebetween, said gap between said drum and said basket of each of said threshing mechanisms being substantially constant along the entire length, said drums of said threshing mechanisms having different diameters; means for articulatingly connecting said baskets of said threshing mechanisms with one another; means for driving said drums of said threshing mechanisms in the same direction; said basket of said first threshing mechanism being adjustable along a substantially straight line, while said basket of said second threshing mechanism being supported rotatably about an axis located at an end which faces away from said basket of said first threshing mechanism; and a single actuating member connected with said threshing means and operative for simultaneously adjusting a gap between said basket and said drum of both said threshing mechanisms.

2. A self-propelling harvester thresher as defined in claim 1, wherein said basket of said first threshing mechanism has an end region and is provided at least in said end region with pins; and further comprising means forming slots which extend parallel to one another in which said pins are displaceable.

3. A self-propelling harvester thresher as defined in claim 1; and further comprising angled levers which are turnable each about a stationary axis, said basket of said first threshing mechanism having an end side and being provided at said end side with shackles which connect said basket of said first threshing mechanism with said angle levers to form a parallelogram.

4. A self-propelling harvester thresher as defined in claim 3, wherein said angled levers have legs which face away from said shackles; and further comprising a link which connects said legs with one another, said single actuating member being formed as a cylinder-piston unit joint turning said angle levers.

5. A self-propelling harvester thresher as defined in claim 1, wherein said baskets have ends which face towards one another; and further comprising a shackle which connects said ends of said baskets.

6. A self-propelling harvester thresher as defined in claim 1, wherein said basket of said first threshing mechanism has an end which faces towards said second threshing mechanism and is angled so as to form an angled region, said angled region being associated with and adjusted to a contour circle of said drum of said second threshing mechanism.

7. A self-propelling harvester thresher as defined in claims 6, wherein said angled region of said basket of said first threshing mechanism is provided with a friction coating which is connected with said basket of said first threshing mechanism turnably about an axis.

8. A self-propelling harvester thresher as defined in claim 7, wherein said friction coating is formed as a flap which is connected with said basket of said first threshing mechanism.

9. A self-propelling harvester thresher as defined in claim 8; and further comprising at least one shackle which support said friction coating from below, and a device displacing said basket of said first threshing mechanism, said shackle having an end which is spaced from said friction coating and drivingly connected with said device.

* * * * *